United States Patent
Sarig et al.

(10) Patent No.: US 9,954,824 B2
(45) Date of Patent: Apr. 24, 2018

(54) EXPOSING AN INTERFACE TO DEVICES OUTSIDE A NETWORK FOR REQUESTING A SUBSET OF SERVICES PROVIDED BY DEVICES INSIDE THE NETWORK

(71) Applicant: Oracle International Corporation, Redwood City, CA (US)

(72) Inventors: Yair Sarig, Foster City, CA (US); Jonathan Klein, Emerald Hill, CA (US); Nirav Gandhi, Lexington, MA (US); Jonathan Soule, Nashua, NH (US); Vinod Ramachandran, Santa Clara, CA (US); Mithilesh Bhat, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 90 days.

(21) Appl. No.: 14/728,106

(22) Filed: Jun. 2, 2015

(65) Prior Publication Data

US 2016/0359810 A1    Dec. 8, 2016

(51) Int. Cl.
```
G06F 9/00      (2006.01)
G06F 15/16     (2006.01)
G06F 17/00     (2006.01)
H04L 29/06     (2006.01)
```
(52) U.S. Cl.
CPC ........ *H04L 63/0272* (2013.01); *H04L 63/029* (2013.01)

(58) Field of Classification Search
CPC . H04L 63/02; H04L 63/0209; H04L 63/0218; H04L 63/029; H04L 63/0272; G06F 21/44–21/445
See application file for complete search history.

(56) References Cited

U.S. PATENT DOCUMENTS

| | | | | |
|---|---|---|---|---|
| 5,826,029 A | * | 10/1998 | Gore, Jr. | H04L 29/06 709/203 |
| 8,868,757 B1 | * | 10/2014 | Liu | H04L 63/0281 709/220 |
| 2003/0229779 A1 | * | 12/2003 | Morais | H04L 29/12009 713/153 |
| 2007/0258470 A1 | * | 11/2007 | Daloz | H04L 12/4633 370/401 |
| 2008/0178278 A1 | * | 7/2008 | Grinstein | H04L 63/0227 726/12 |
| 2008/0189781 A1 | * | 8/2008 | Pathak | H04L 12/24 726/12 |

(Continued)

OTHER PUBLICATIONS

Cisco, "Cisco Intercloud Fabric: Hybrid Cloud with Choice, Consistency, Control and Compliance", Dec. 10, 2014, 22 pages.

(Continued)

*Primary Examiner* — Trong Nguyen
(74) *Attorney, Agent, or Firm* — Invoke

(57) ABSTRACT

A method includes extending an interface, to a device outside a firewall, for requesting a service performed by a device inside the firewall. The interface is extended using a software component, executing outside the firewall, which executes a separate interface to accept requests for services from devices outside the firewall. The separate interface, exposed outside the firewall, is configured for accepting a subset of the services available inside the firewall.

20 Claims, 5 Drawing Sheets

(56) References Cited

U.S. PATENT DOCUMENTS

| | | | |
|---|---|---|---|
| 2009/0300750 A1* | 12/2009 | Chou | H04L 63/029 |
| | | | 726/12 |
| 2011/0282969 A1* | 11/2011 | Iyer | G06F 17/3056 |
| | | | 709/217 |
| 2013/0283364 A1 | 10/2013 | Chang et al. | |
| 2014/0006475 A1* | 1/2014 | Harpster | G06F 17/30861 |
| | | | 709/202 |
| 2014/0244851 A1 | 8/2014 | Lee | |
| 2014/0259177 A1* | 9/2014 | P | G06F 21/60 |
| | | | 726/26 |

OTHER PUBLICATIONS

Fedora, "IPsec Network-to-Network Configuration", Available Online at <https://docs.fedoraproject.org/en-US/Fedora/14/html/Security_Guide/sect-Security_Guide-Virtual_Private_Networks_VPNs-IPsec_Network_to_Network_Configuration.html>, Retrieved on Mar. 31, 2015, 3 pages.

Snyder, Joel, "IPSec VPN alternatives", Networkworld, Available Online at <http://www.networkworld.com/article/2342896/lan-wan/ipsec-vpn-altern>, Oct. 28, 2002, 1 page.

"Splashtop Enterprise", Splashtop, Inc., 2013, 2 pages.

* cited by examiner

EXPOSING AN INTERFACE TO DEVICES OUTSIDE A NETWORK FOR REQUESTING A SUBSET OF SERVICES PROVIDED BY DEVICES INSIDE THE NETWORK

TECHNICAL FIELD

The present disclosure relates to communications between devices inside a network and devices outside the network. In particular, the present disclosure relates to exposing to devices outside a network an interface for requesting a subset of services provided by devices inside the network.

BACKGROUND

A hybrid cloud is a computing environment that utilizes both a private cloud (for example, an on-premise or private network) and a public cloud (for example, remote servers and software networks provided by a service provider). Privacy and security are key concerns when exchanging data between the private and public clouds.

To protect private and confidential data, a private network is generally protected by a network security system, such as a firewall. Communications in and out of the firewall needs to match security criteria set by the firewall. Conventionally, virtual private networks (VPNs) have been used to provide devices outside the private network authorized access through the firewall to devices inside the private network. Generally, once a VPN connection is established between a private network and a device outside the private network, the device outside the private network can access any device in the private network without the protection of the firewall.

In some instances, a device outside of a private network only needs to communicate specific requests for service, instructions, operations, or data with a specific subset of devices inside the private network. Conventionally, the firewall or VPN server is manually configured to limit the devices, data, software, or resources that a device outside the private network can access over the VPN.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
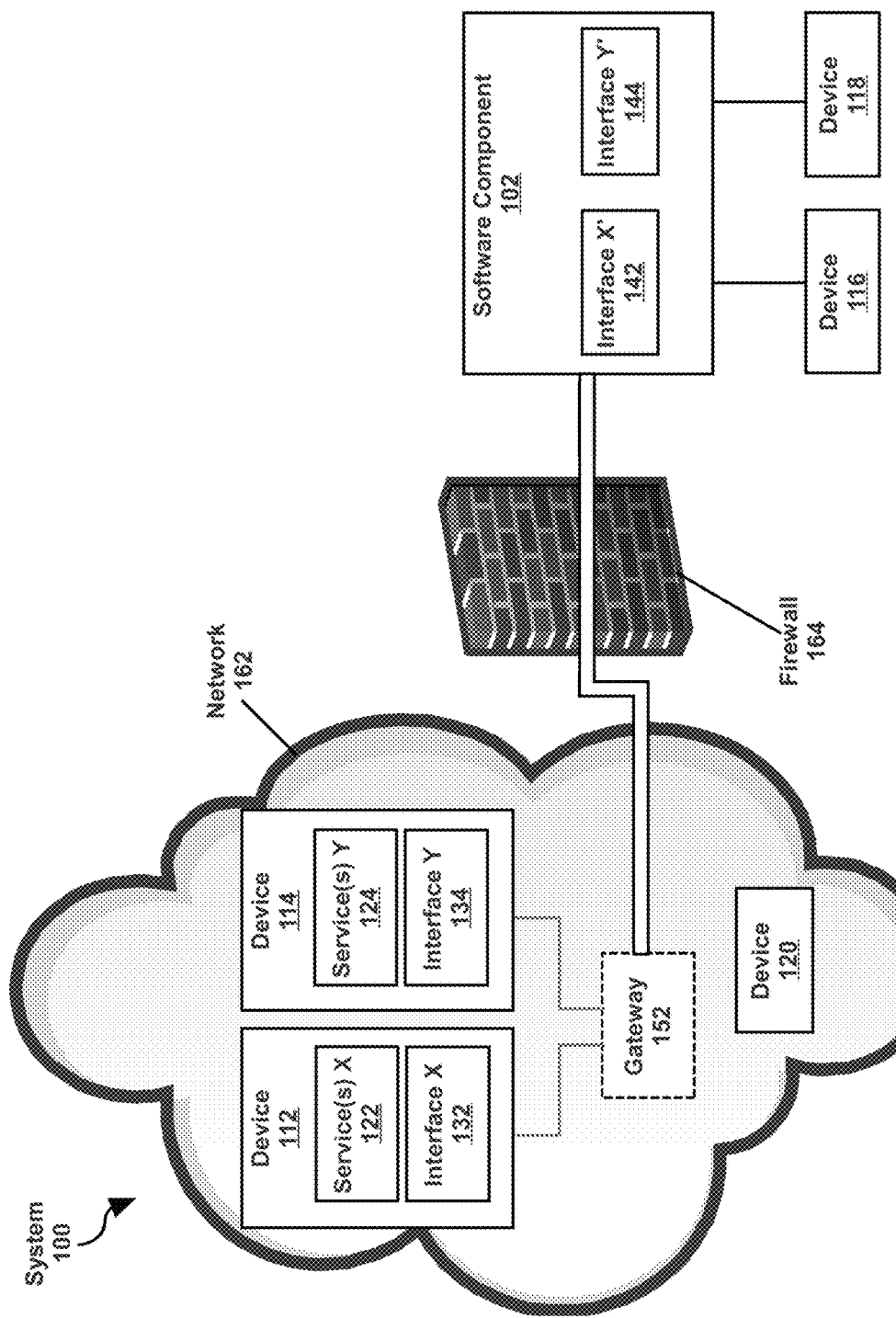
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. EXTENDING AN INTERFACE TO DEVICES OUTSIDE A FIREWALL FOR REQUESTING A SUBSET OF SERVICES FROM DEVICES INSIDE THE FIREWALL
4. EXECUTING AN INTERFACE OUTSIDE OF A FIREWALL FOR REQUESTING A SUBSET OF SERVICES FROM DEVICES INSIDE THE FIREWALL
5. EXECUTING A SERVICE BY DEVICES INSIDE A FIREWALL
6. EXAMPLE EMBODIMENT
7. MISCELLANEOUS; EXTENSIONS
8. HARDWARE OVERVIEW

1. General Overview

In one or more embodiments, a software component outside of a private network exposes an interface, for requesting services, to a first set of one or more devices outside of the private network. The services exposed by the software component are services provided by a second set of one or more devices located inside a private network protected by a firewall. The first set of devices are referred to herein as being located outside the firewall and the second set of devices are referred to herein as being located inside the firewall.

In one or more embodiments, only a subset of the services provided by the second set of devices inside the firewall are exposed by the software component to the first set of devices outside the firewall. While numerous services may be performed by the second set of devices, only a subset of these services may be necessary for the first set of devices. By limiting the services exposed, the accessibility of the second set of devices to devices outside the firewall is minimal. Thus, if a first device in the first set of devices erroneously requests a service that is not within the subset of services being exposed, the request is rejected or dropped, and the service is not performed. Further, if an intruder device gains access to the interface exposed by the software component, the intruder device may only request the subset of services being exposed, not the entire set of services provided by the second set of devices.

In one or more embodiments, the software component does not include functionality to perform the services that the software component exposes. When the software component receives a request to perform a service from a first device in the first set of devices, the software component does not perform the service but rather causes the service to be performed by a second device of the second set of devices, inside the firewall, at least by forwarding the request to the second device. The service is performed by the second device, which transmits corresponding data, such as an acknowledgement, back to the software component. The software component forwards this data back to the first device.

In one or more embodiments, the software component forwards a request for services to a gateway, located inside the firewall, which then forwards the request to a second device in the second set of devices. The gateway initiates a secure connection with the software component. Since the connection is initiated by a device inside the firewall, the firewall allows this connection. Further, the gateway maintains a persistent connection with the software component, allowing communications to be exchanged between the gateway and the software component. Thus, the software component may forward a request for service made by a first device to the gateway through the persistent connection.

In one or more embodiments, the gateway maintains a whitelist that identifies one or more devices that are allowed to communicate with the gateway. When the gateway receives a communication from the software component, the gateway checks the identity of the software component against the whitelist. The gateway forwards the communication to a second device in the second set of devices only if the software component is listed in the whitelist.

In one or more embodiments, a first device in the first set of devices outside the firewall is configured to request services from the software component. The first device executes operations that require particular services that are performed by another device. The first device may have a memory location or field for storing information indicating where these particular services may be requested from. This memory location or field may be configured at deployment or installment, or may be updated in real time. The particular services required may be services provided by a second set of devices inside the firewall. However, the first set of devices cannot be configured to request these services from the second set of devices because the first set of devices cannot directly communicate with the second set of devices due to the firewall. Thus, the first set of devices is configured to request the services from the software component, which then forwards the requests to the second set of devices.

In one or more embodiments, a firewall is not used. The second set of devices is on a private network, and the first set of devices is not in the private network. The second set of devices provides a set of services to devices in the private network. A software component executed outside of the private network exposes an interface for a subset of these services to the first set of devices. Thus the first set of devices may request services from the second set of devices. Examples herein which refer to a firewall are equally applicable to embodiments without the firewall.

2. Architectural Overview

FIG. 1 illustrates a system in accordance with one or more embodiments. As illustrated, system 100 includes a network 162, a firewall 164, devices 112-120, services X 122 of device 112, services Y 124 of device 114, interface X 132 for requesting services X 122, interface Y 134 for requesting services Y 124, software component 102, interface X' 142, interface Y' 144, and a gateway 152. In one or more embodiments, system 100 may include more or less components, than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In an embodiment, network 162 is a private cloud or private network. In some deployments, the private network corresponds to an on-premise network. Network 162 may include, but is not limited to, one or more local area networks (LAN), wide area networks (WAN), virtual private networks (VPN), or intranets. Network 162 may or may not be protected by a network security system, such as firewall 164.

In an embodiment, firewall 164 is any type of network security system that controls incoming and/or outgoing network traffic based on a set of rules. Firewall 164 may include, but is not limited to, network layer or packet filters, stateful filters, application layer filters, or network address translation (NAT) functionality. Firewall 164 may be implemented in software, hardware, or both. In other embodiments, firewall 164 is not used.

In an embodiment, devices 112-120 are used interoperably in a computing environment. Devices 112-120 may be any application, program, or machine, and may be implemented in hardware and/or software. Devices 112-120 may be, for example, an authentication server, a web server, a network policy server, a deep packet inspection (DPI) server, a management server, a client device, a computer, a tablet, a laptop, a desktop, a set-top box, a video gaming console, a printer, a smartphone, an access point, a router, or a switch. As illustrated, device 112, device 114, and device 120 are inside network 162. Device 112, device 114, and device 120 may be referred to herein as being inside firewall 164 or being behind firewall 164. As illustrated, device 116 and device 118 are outside network 162, and may not be secure or trusted with respect to network 162. Device 116 and device 118 may be referred to herein as being outside firewall 164 or in front of firewall 164. In an example, device 116 and device 118 are part of a public or community cloud, which is accessible by network 162 via the Internet. In an example, device 116 and device 118 are resources provided by a service provider.

In an example, device 112 is a management server that is implemented on a user's on-premise network. Device 112 manages a set of one or more target devices, which may be implemented in hardware and/or software and may be inside or outside network 162. Each target has an agent, which is a daemon running on the software of the target that sends status, performance, and configuration data of the target to the management server. Device 116 is an agent of one of the target devices managed by device 112 and is implemented outside of the on-premise network, such as on a public cloud.

In an embodiment, services X 122 and services Y 124 are sets of routines, protocols, modules, tools, or mechanisms that perform and/or accomplish a task on one or more computing devices. Examples of services include but are not limited to authenticating a new device as a trusted device, uploading data, retrieving data, analyzing or processing data, searching data, sorting data, or providing acknowledgement demonstrating that a connection between devices is still alive. As illustrated, services X 122 are performed by device 112, and services Y 124 are performed by device 114.

In an embodiment, interface X 132, interface Y 134, interface X' 142, and interface Y' 144 make available services performed by one device to other devices, enabling multiple devices or applications to interact. An interface of a device or application includes a set of routines, protocols, modules, tools, or mechanisms that may be commanded, called upon, or requested by other devices or applications.

An interface also includes a set of routines, protocols, modules, tools, or mechanisms that provide confirmation, acknowledgment, an error message, or other requested data to a device or application requesting a service. In an example, device 120 may request services X 122 to be performed by device 112 through interface X 132. Interface X 132 verifies the request to determine whether the request is for an available service. If not, interface X 132 determines that the request is invalid, and may return an error message. If yes, interface X 132 causes the requested service to be performed, and may return a confirmation or other requested data.

In an embodiment, an interface is configured to accept a command as well as input associated with the command. For example, a command to the interface requests the uploading of data, and input associated with this command includes the data that is to be uploaded as well as a memory address to which the data is to be uploaded. An interface makes available a service to other devices without necessarily making public the actual implementation of the service. Thus, a device requesting a service through an interface may not be aware of the actual variables and procedures used to perform the service. The device requesting the service simply receives the requested data through the interface after the service is performed. Examples of interfaces include but are not limited to an application programming interface (API), a command line interface (CLI), and software interfaces.

In an embodiment, an interface of a device or application makes available services that are performed by the device or application itself. As illustrated, for example, interface X 132 and interface Y 134 of devices 112 and 114, respectively, make available services X 122 and services Y 124, which are to be performed by devices 112 and 114, respectively.

In an embodiment, an interface of a device or application makes available services that are not performed by the device or application itself. Such an interface may be referred to herein as a fictitious or shell interface. As illustrated, for example, interface X' 142 and interface Y' 144 make available services X 122 and services Y 124, respectively, which are not performed by the device or application exposing interface X' 142 and interface Y' 144.

In an embodiment, an interface of a device or application makes available services that are performed by another device or application. As illustrated, for example, interface X' 142 and interface Y' 144 make available services X 122 and services Y 124, which are to be performed by devices 112 and 114 inside network 162, to devices 116-118 outside network 162. Services X 122 and services Y 124 are requested in the same way through interface X' 142 and interface Y' 144 as through interface X 132 and interface Y 134. Further, confirmation messages, acknowledgements, error messages, and other data are returned the same way through interface X' 142 and interface Y' 144 as through interface X 132 and interface Y 134. Meanwhile, devices 112-114 inside network 162, as well as services X 122, services Y 124, interface X 132, and interface Y 134, need not be aware that a request for service is originating from outside network 162. Devices 112-114 perform the same way regardless of whether the request for service is originating from inside or outside the network. Similarly, devices 116-118 need not be aware that a requested service is performed by a device different from the device that is exposing an interface to devices 116-118. By making available services X 122 and services Y 124, interface X' 142 and interface Y' 144 may be referred to herein as extending interface X 132 and interface Y 134 outside network 162.

In an embodiment, an interface of a device or application makes available only a subset of services that are performed by another device or application. For example, interface X' 142 and interface Y' 144 make available only a subset of services X 122 and services Y 124. Interface X' 142 is configured with the subset of services X 122 such that the software component 102 is unaware of a portion of services X 122 performed by device 112. This limited exposure restricts the services that may be requested by devices 116-118 outside network 162.

In an example, device 116 makes a request for a particular service within services X 122 through interface X' 142, however this particular service is not exposed by interface X' 142. Interface X' 142 receives the request and attempts to verify the request. Interface X' 142 determines that the particular service is not an available service. In fact, interface X' 142 may not recognize the particular service. The particular service, when requested by device 116, is not performed. However, if device 120 makes a request for this same particular service within services X 122 through interface X 132, interface X 132 determines that the particular service is an available service. The particular service, when requested by device 120, is performed.

In an embodiment, software component 102 includes one or more digital devices configured to perform operations described herein for exposing an interface to devices outside a network for requesting a subset of services to be performed by devices inside a network. The term "digital device" generally refers to any hardware device that includes a processor. A digital device may refer to a physical controller device or a hardware device executing a virtual machine (e.g., a virtual controller).

Examples of digital devices include a computer, a tablet, a laptop, a desktop, a netbook, a server, a web server, a network policy server, a mainframe, a television, a content receiver, a set-top box, a video gaming console, a printer, a mobile handset, a smartphone, a personal digital assistant ("PDA"), a wireless receiver and/or transmitter, an access point, a base station, a communication management device, a router, a switch, and/or a controller.

In an embodiment, software component 102 is implemented outside network 162. Software component 102 is outside of firewall 164 or otherwise referred to herein as being in front of firewall 164. Software component 102 may be implemented as software, hardware, or both. Software component 102 may be executed or installed as part of devices 116-118, may be separate from devices 116-118, or may be distributed over several different devices or machines. In an embodiment, software component 102 exposes one or more interfaces to multiple devices, such as devices 116-118 as illustrated. In another embodiment (not shown), one instance of software component 102 is implemented on device 116, and another instance of software component 102 is implemented on device 118.

In an embodiment, software component 102 exposes interface X' 142 and interface Y' 144, which make available at least a subset of services X 122 and services Y 124, but software component 102 does not include functionality to perform services X 122 and services Y 124.

In an embodiment, which should not be construed as limiting the scope of the claims, software component 102 exposes only a subset of services as well as only a subset of devices available inside network 162. As illustrated, for example, devices 112-114 are accessible to devices 116-118 but device 120 is not.

In an embodiment, when software component 102 receives a request to interface X' 142 or interface Y' 144, software component 102 causes the requested service to be performed by device 112 or device 114 at least by forwarding the request inside network 162 to device 112 or device 114 or gateway 152.

In an embodiment, gateway 152 includes one or more digital devices configured to perform operations to serve as an intermediary between software component 102 and devices 112-114. Gateway 152 may be implemented in software, hardware, or both. Gateway 152 receives data from one device, and forwards the data to another device. Gateway 152 may implement a whitelist to determine that the sender of the data is valid before forwarding the data to another device.

Figure 2:
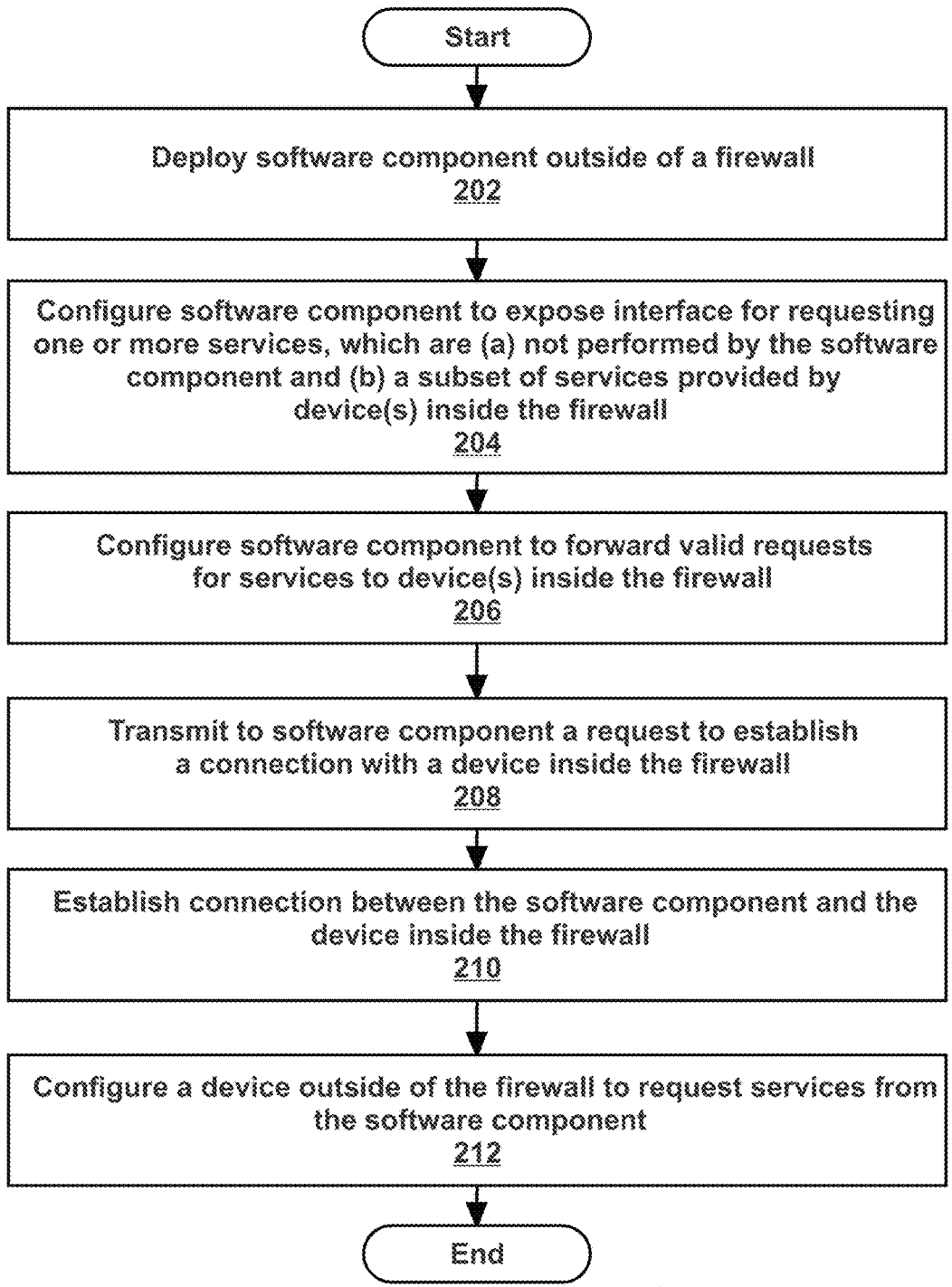
FIG. 2 illustrates an example set of operations for extending an interface to one or more devices outside a firewall for requesting a subset of services from one or more devices inside the firewall in accordance with one or more embodiments.

3. Extending an Interface to Devices Outside a Firewall for Requesting a Subset of Services from Devices Inside the Firewall FIG. 2 illustrates an example set of operations for extending an interface to one or more devices outside a firewall for requesting a subset of services from one or more devices inside the firewall in accordance with one or more embodiments. Operations as described herein with reference to FIG. 2, may be omitted, rearranged, or modified. Furthermore, operations may be added or performed by different components or devices. Accordingly, the specific set or sequence of operations should not be construed as limiting the scope of any of the embodiments.

FIG. 2 shows an example set of operations that is performed by one or more devices that set up, deploy, or install a system in accordance with one or more embodiments. FIG. 2 illustrates an example set of operations for implementation in an embodiment using a firewall. However, the operations may also be implemented in another embodiment that does not use a firewall, such as an embodiment using a private network that does not use a firewall. The operations shown may be performed by a gateway, a device inside a firewall or network that performs a service requested by a device outside of the firewall or network, a device that serves as a management server inside a firewall, another device, or a combination of these devices.

Initially, a software component is deployed outside of a firewall (Operation 202). In an example, a first device running a first software or application is located outside of a firewall. The software component is deployed when the software component is received by the first device and is installed as an additional component or an update to the first software or application. The software component is received by the first device from the second device using either a data push (for example, a second device inside the firewall initiates a request to transmit the software component to the first device) or a data pull (for example, the first device initiates a request to receive the software component from the second device). In another example, the software component is deployed together with dedicated hardware that executes the software component, the dedicated hardware being implemented outside of the firewall.

In an embodiment, the software component is configured to expose an interface for requesting one or more services, wherein the services exposed are (a) not performed by the software component, and (b) a subset of the services provided by one or more devices inside the firewall (Operation 204). Configuring the software component to expose an interface includes writing, compiling, running, or executing a set of protocols, routines, modules, or code that may be called upon or requested by other devices, applications, or machines. Configuration for the software component may be performed by a device inside the firewall, or another device. The interface defines a set of instructions, inputs, and formats, to be used in order to initiate particular services.

In an embodiment, the interface of the software component, executing on a first device outside of a firewall, may be an extension of the interface of a second device inside the firewall. In one example, the format for requesting services of the second device defined by the interface exposed by the software component may match the format for requesting services of the second device defined by the interface of the second device. In an example, the interface of the software component exposes services such that the services are identified as being performed by the software component, or such that the services are identified as being executed on a device that is executing the software component. Thus, in an example, the protocols, routines, modules, or code used by a first device outside the firewall to request services is the same, whether the first device is requesting the services from the software component or the second device.

In an embodiment, the interface of the software component exposes services for which the software component has no functionality to perform. While the software component is able to process incoming data matching a format defined by the interface, the software component does not include a set of routines, protocols, modules, or code to perform the particular service.

In an embodiment, the interface of the software component, outside the firewall, exposes only a subset of services that are provided by a second set of one or more devices inside the firewall. This limitation restricts the services that are available outside the firewall. For example, device A and device B are located inside a firewall and provide a first set of ten services, and a second set of twenty services, respectively. The interface of the software component is configured to expose only three of the first set of services, and all twenty of the second set of services. Thus, devices outside the firewall may access only three services of device A, and all of the services of device B when requesting the services via the software component. In addition, none of the services provided by another device, device C, inside the firewall are exposed by the interface of the software component. Accordingly, devices outside the firewall cannot access any of the services provided by device C via the software component.

In an embodiment, the software component is configured to forward valid requests for services to one or more devices inside a firewall (Operation 206). Configuration may be performed by a device inside the firewall, or another device. Configuration includes defining a set of rules to be executed by the software component to determine whether a received request is a valid request (as further detailed below with reference to FIG. 3). Configuration further includes defining a destination address of a device inside the firewall to which the valid requests are to be forwarded by the software component.

In an example, when the software component receives a valid request for performance of a particular service, the software component is configured to forward the request for the particular service inside the firewall, to either a second device that performs the particular service, or to a gateway that forwards the request to the second device.

In an embodiment, a request to establish a connection with a device inside the firewall is transmitted to the software component (Operation 208). The device inside the firewall with which the connection is established may be the second device that performs the service requested by the first device, a gateway, or another device inside the firewall. Since the request to connect is initiated from a device inside the firewall, the request and the ensuing connection are not blocked by the firewall. In an example, the firewall need not make any exceptions to allow this communications to go through.

In an embodiment, a connection is established between the software component outside the firewall and a device inside the firewall (Operation 210). In an example, the connection is a secure connection, using an encrypted network protocol (for example, secure shell (SSH)). In an example, the connection is a persistent connection. For example, a single connection can be used to send and receive multiple requests and responses. This connection is used for communicating requests for services and responses thereto between the software component and the device inside the firewall.

In an embodiment, a first device in a first set of one or more devices outside the firewall is configured to request services from the software component (Operation 212). The software component may be executing on the first device itself or another device outside of the firewall that is in communication with the first device. The first devices includes a memory location, tag, field, table, database, or other storage for storing information identifying the software component (or interface thereof) as a destination for transmitting requests to perform a set of services. For example, a TCP/IP address, host name, or other identifier corresponding to the software component is stored at the first device.

This configuration of the first device may be performed manually or automatically. In an embodiment, the configuration of the first device is performed by a second device inside the firewall which performs services requested by the first device. In an embodiment, the configuration of the first device is done at deployment of the system in accordance with one or more embodiments. In another embodiment, this configuration is done in real time and is changed dynamically depending on the services being requested. For example, the first device may store a table mapping a set of interfaces outside of the firewall to a set of services that may be requested via the interfaces. When the first device needs to request a service, the first device looks up the table to determine which interface the service should be requested from.

Figure 3:
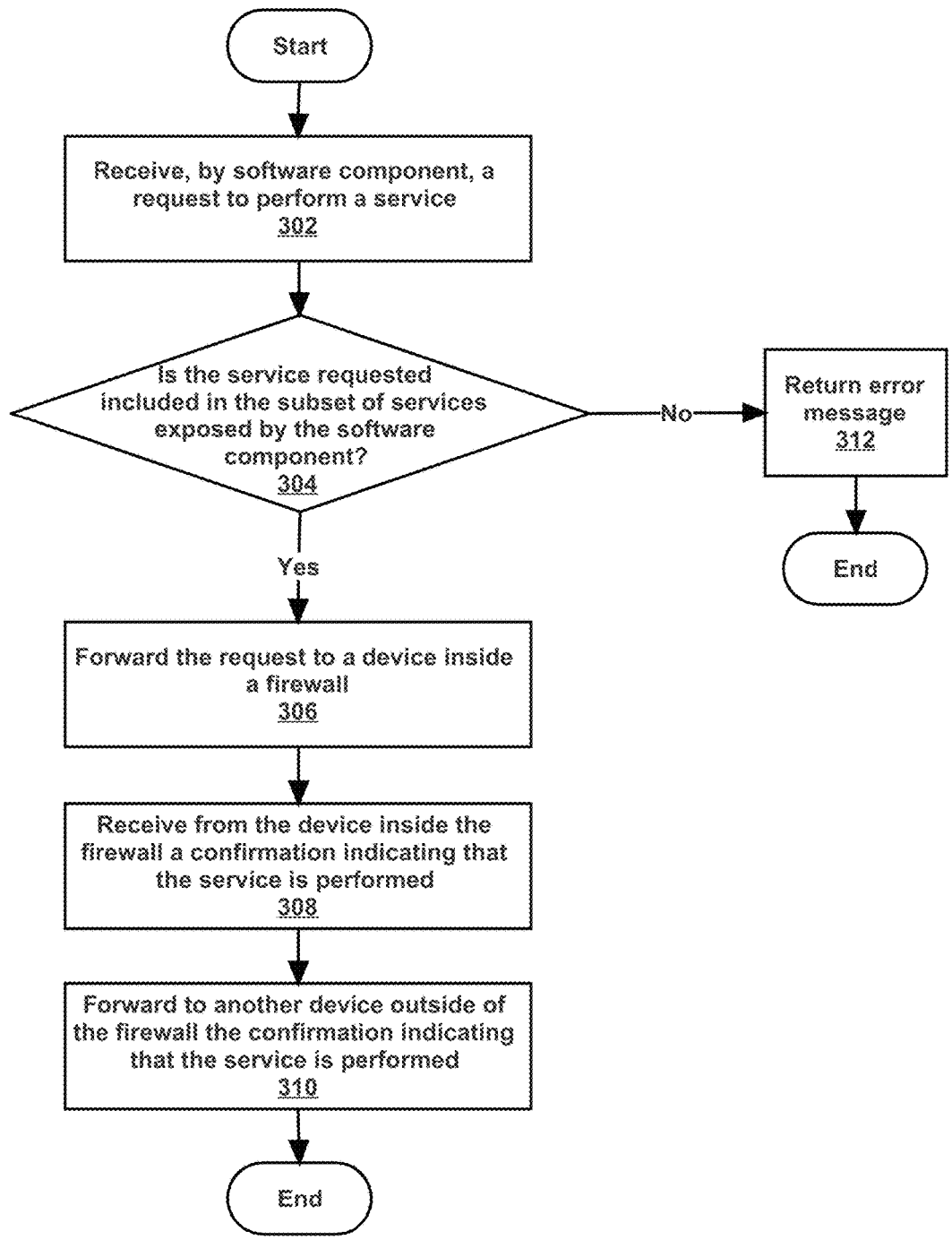
FIG. 3 illustrates an example set of operations for executing an interface for requesting a subset of services from one or more devices inside a firewall in accordance with one or more embodiments.

4. Executing an Interface Outside a Firewall for Requesting a Subset of Services from Devices Inside the Firewall FIG. 3 illustrates an example set of operations for executing an interface for requesting a subset of services from one or more devices inside a firewall in accordance with one or more embodiments. FIG. 3 illustrates an example set of operations for implementation in an embodiment using a firewall. However, the operations may also be implemented in another embodiment that does not use a firewall. Operations as described herein with reference to FIG. 3, may be omitted, rearranged, or modified. Furthermore, operations may be added or performed by different components or devices. Accordingly, the specific set or sequence of operations should not be construed as limiting the scope of any of the embodiments.

Initially, a request to perform a service is received by a software component that exposes, to a first set of one or more devices outside of a firewall, a subset of services provided by a second set of one or more devices inside of the firewall (Operation 302). The request is received from a first device of the first set of devices. The software component and the first set of devices are outside a firewall, and the second set of devices is inside the firewall. In an example, the request may be received using a secure network protocol (for example, secure hypertext transfer protocol (HTTPS)). In an example, the first device executes both the software component and an application originating the request for service. In another example, the first device and the software component are executed on different devices, which may or may not be part of the same network. The requested services are to be performed by one or more devices inside a different network than the software component and the first device.

An inquiry as to whether the service requested is included in the subset of services exposed by the software component is performed (Operation 304). Making this inquiry includes parsing or analyzing incoming data to the software component, to determine whether the incoming data matches one of the set instructions defined by the interface exposed by the software component. As described above with reference to Operation 204, the interface makes available a subset of services provided by the second set of devices inside the firewall. The interface defines a set of instructions, including inputs, formats, structures, and/or command lines, to be used for requesting these services. In an example, if there is no match between the incoming data and the services exposed by the interface, then an error message is returned (Operation 312). In another example, if there is no match between the incoming data and the services exposed by the interface, the incoming data is ignored or dropped. If there is a match, a determination is made that the requested service is included in the subset of services exposed by the software component. Optionally, the software component may verify that the requestor of the service is actually authorized to request the service.

In an embodiment, if the requested service is included in the subset of services exposed by the software component, then the request is forwarded to a device inside the firewall (Operation 306).

In an embodiment, forwarding the request includes transmitting the same request, packet, or message body that was received to a different device. In an example, the request received by the software component is "Upload X to server." The software component forwards this request by transmitting "Upload X to server" to another device inside the firewall. In another example, the forwarded data packet has a message body including the same request as the original data packet, but the forwarded data packet has a header including an addressee that is different from the original data packet. In another example, the forwarded message is a translated version of the original message, but the forwarded message and the original message include a request for the same service. The device inside the firewall that receives the forwarded message may be a second device that performs the service requested, a gateway (that forwards the forwarded message again to the second device), or another device inside the firewall. Accordingly, performance of the service by the second device inside the firewall may be caused by the software component at least by forwarding the request inside the firewall.

In an embodiment, a confirmation indicating that the service is performed is received from a device inside the firewall (Operation 308). The confirmation is transmitted by the device inside the firewall after the service requested is performed by the device inside the firewall. In another example, another type of message or other data reflecting the status of the performance of the service is received from a device inside the firewall. In another example, the requested service is to retrieve certain data xyz from a server, and the data xyz requested is received from a device inside a firewall. As described above in Operation 306, the device inside the firewall may be the second device (which performs the service), a gateway, or another device inside the firewall.

In an embodiment, the confirmation indicating that the service is performed is forwarded by the software component to the device outside the firewall that originated the request (Operation 310). Forwarding the confirmation includes transmitting the same confirmation, packet, or message body that was received to the request originating device. In an example, the confirmation being forwarded includes a false indication that the software component has performed the service requested. For example, the confirmation includes a message indicating that the service is performed as well as a field indicating an address or identifier of the device that performed the service, and this field is inserted with an identifier of the software component. In another example, other data falsely indicating that the services are being performed by the software component, or that the services are being executed on a device that is executing the software component is transmitted. Thus, for example, from the perspective of the request originating device, the particular service is performed by the software component. The request originating device is unaware that the software component uses a shell interface which accepted and forwarded the request for performance by another device inside the firewall.

5. Executing a Service by Devices Inside a Firewall

Figure 4:
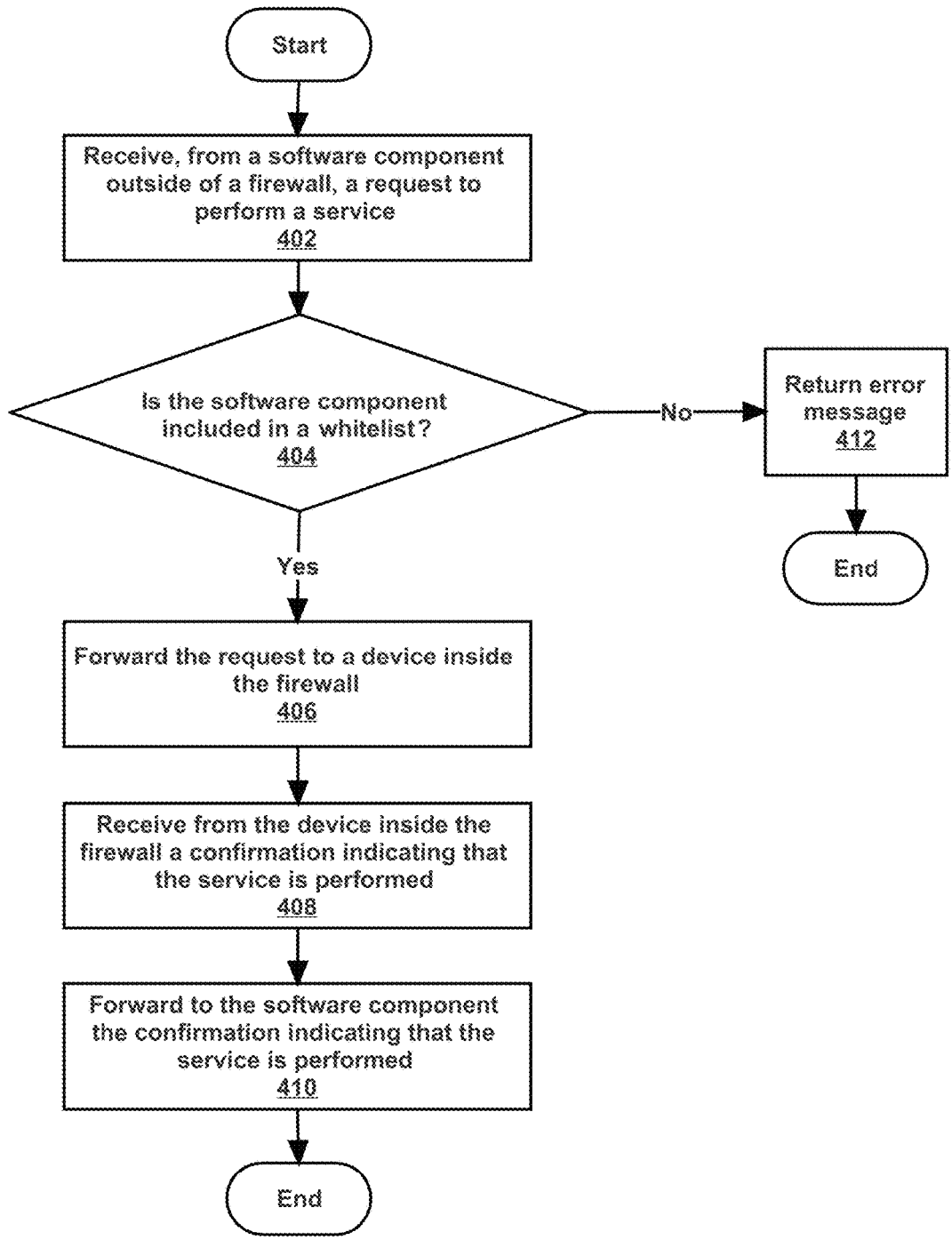
FIG. 4 illustrates an example set of operations for executing a service by one or more devices inside a firewall, the service being requested by a device outside a firewall, in accordance with one or more embodiments.

FIG. 4 illustrates an example set of operations for executing a service by one or more devices inside a firewall, the service being requested by a device outside a firewall, in accordance with one or more embodiments. FIG. 4 illustrates an example set of operations for implementation in an embodiment using a firewall. However, the operations may also be implemented in another embodiment that does not use a firewall. Operations as described herein with reference to FIG. 4, may be omitted, rearranged, or modified. Furthermore, operations may be added or performed by different components or devices. Accordingly, the specific set or sequence of operations should not be construed as limiting the scope of any of the embodiments.

Initially, a request to perform a service is received from a software component that exposes, to a first set of one or more devices outside a firewall, a subset of services provided by a set of one or more devices inside the firewall (Operation 402). The request is a forwarded request from the software component, with the original request originating from a first device of the first set of devices. In an example, the request is received by a gateway, located inside the firewall, which then directs the request to the correct recipient inside the firewall. The request is communicated through a secure connection between the gateway and the software component, which is outside the firewall. The secure connection is established using, for example, an encrypted network protocol (for example, SSH). The request for the secure connection is initiated by the gateway. In another example, the request is received directly by a device, inside the firewall, that is to perform the service (without being transmitted through a gateway).

In an embodiment, an inquiry is made as to whether a sender of the request (for example, the software component) is included in a whitelist (Operation 404). A whitelist is a list of addresses or identifiers of devices that are authorized to communicate with the device inside the firewall. A whitelist includes a set of permissions associated with the software component and/or the first device, which requested the service. The whitelist is stored in a memory accessible by a gateway inside the firewall, which may be local to or remote from gateway. The whitelist may be configured during deployment of a system in accordance with one or more embodiments. For example, when a software component is being deployed (Operation 202), the gateway is configured to include the software component on the whitelist. When a request is received by a gateway, the gateway determines whether the sender of the request matches at least one of the addresses or identifiers on the whitelist. If no, then the sender is not authorized, and the gateway refrains from forwarding the request to another device inside the firewall based on the set of permissions included in the whitelist. In an example, if the sender is not authorized, an error message is returned (Operation 412). In another example, the request is declined, ignored, or dropped.

In an embodiment, an inquiry is made as to whether a device/user originating the request, that was forwarded by the software component, is authorized. The originating device/user is identified and compared to a list of authorized devices/users that have permissions associated with the request. If the device/user does not have necessary permissions, the request may be declined and/or dropped.

In an embodiment, if the sender of the request matches one of the addresses or identifiers on the whitelist, then the request is forwarded by a gateway to a device inside the firewall that is to perform the requested service (Operation 406). Forwarding the request includes transmitting the same request, packet, or message body that was received to a different device. In an example, the gateway only forwards requests to a single device inside the firewall. This single device is the second device in the second set of devices, which performs the services requested by the first device. In another example, the gateway forwards requests to multiple devices inside the firewall. The gateway determines which device, to forward the request to, based on the request itself and/or other information. For example, device A and device B are inside a firewall, and provide service X and service Y, respectively. The gateway receives a request to perform service X. Based on the service requested and the services provided by devices A and B, the gateway forwards the request to perform service X to device A rather than device B.

In an embodiment, a confirmation indicating that the service is performed is received by the gateway (Operation 408). The confirmation is transmitted to the gateway by the device inside the firewall that performed the service. In an example, another type of message or other data reflecting or based on the status of the performance of the service is received by the gateway from the device inside the firewall that performed the service. In another example, the service requested may be to retrieve certain data from a server, and the data requested is received by the gateway from a device inside a firewall.

In an embodiment, the confirmation indicating that the service is performed is forwarded from inside the firewall to the software component outside of the firewall (Operation 410). Forwarding the confirmation includes the gateway transmitting the same confirmation, packet, or message body that was received from the device performing the service, to the software component outside of the firewall. The software component may then forward the confirmation to the device which originally requested the service.

In an embodiment, a system is implemented without the use of a gateway. The software component outside of the firewall directly communicates with a second device inside the firewall. In an example, the software component forwards requests directly to a device inside the firewall which provides the requested service. In another example, the software component forwards requests to multiple devices inside the firewall. The software component may determine which device, to forward a request to, based on the request itself and/or other information. The request for service is received by a second device inside the firewall from the software component. The service is then performed by the second device. A confirmation indicating that the service is performed (or other data) is transmitted from the second device to the software component. The confirmation is then forwarded by the software component to the first device, which requested the service.

6. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

In one example, a management server, inside a firewall, manages a set of targets. The targets refer to software and/or hardware implemented inside or outside the firewall. Each target has an agent, which is a daemon running on the software of the target that sends status, performance, and configuration data of the target to the management server.

A device outside of the firewall is an agent of a particular target device managed by the management server. As part of its management role, the management server provides a large set of services. Only a subset of services provided by the management server are required by the agent of the particular target device in order to facilitate management server's management of the agent and the target device. The subset of services required by the agent includes authenticating a new device, uploading data to the management server, retrieving data from the management server, and providing acknowledgement demonstrating that a connection with the management server is still alive. Further, access to other devices inside the firewall is not required by the agent of the particular target device.

A software component is deployed outside the firewall. The software component is configured to expose an interface, for requesting the subset of services of the management server, to the agent of the particular target device. The agent is configured to request services from the software component. A secure connection is established between the software component and a gateway, which is located inside the firewall and configured to serve as an intermediary between the software component and the management server.

The agent transmits a request to an interface of the software component to upload data to the management server. The software component receives the request and determines that the request is included in the subset of services made available by the interface. The software component forwards the request to the gateway inside the firewall. The gateway forwards the request to another interface that corresponds to the management server. The management server completes the upload operation and transmits a confirmation to the gateway that the upload is performed. The gateway forwards the confirmation to the software component. The software component receives the confirmation from the gateway and forwards the confirmation to the agent of the particular target device. Thus, from the perspective of the agent, a request for an upload service is sent to the interface of the software component, and a confirmation that the upload is performed is received from the software component. From the perspective of the agent, the communications between the agent and the management server are not affected by the firewall. The actual interface corresponding to the management server is invisible to the agent of the particular target device. The agent of the particular target device communicates with the interface exposed by the software component outside of the firewall as though the agent was communicating with the interface corresponding to the management service inside the firewall.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
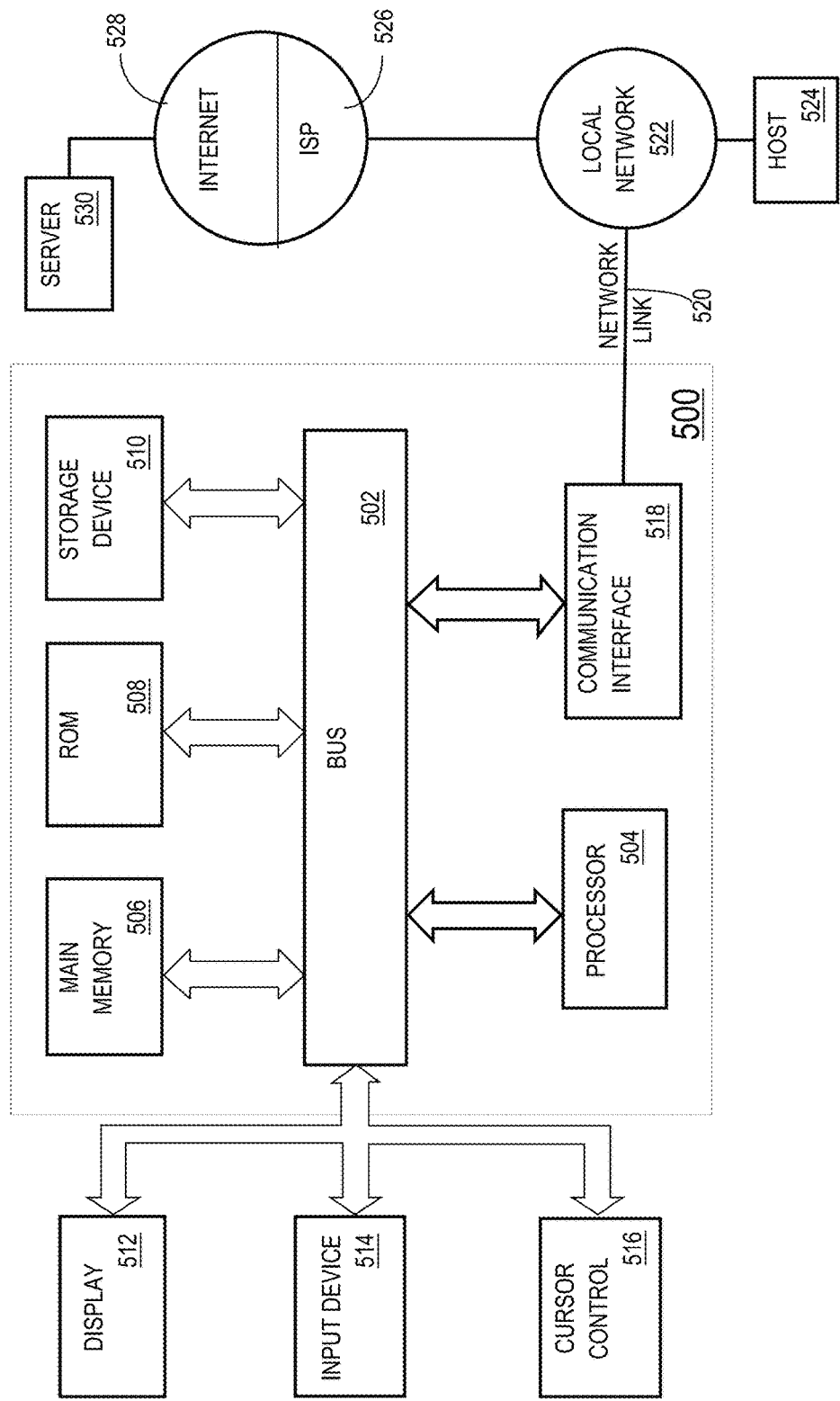
FIG. 5 is a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    executing a software component outside of a firewall that exposes, to a first set of one or more devices outside of the firewall, a first interface for requesting a first subset of a set of services provided by a second device inside of the firewall, without exposing any interface to request a second subset of the set of services provided by the second device;
    wherein the second device provides, to a second set of one or more devices inside the firewall, a second interface for requesting any of the set of services;

wherein the first interface receives requests from the first set of one or more devices outside the firewall, for the first subset of the set of services, in a particular format;

wherein the second interface receives requests from the second set of one or more devices inside the firewall, for the first subset of the set of services, in the particular format;

wherein the software component does not include functionality to perform the first subset of the set of services;

receiving, by the software component from a first device in the first set of one or more devices outside of the firewall, a request to perform a particular service of the first subset of the set of services; and causing, by the software component, the particular service to be performed inside of the firewall at least by forwarding the request to perform the particular service to the second device inside of the firewall;

wherein the method is performed by at least one device including a hardware processor.

2. The method of claim 1, further comprising:
prior to the software component receiving the request to perform the particular service
configuring the first device to request the first subset of the set of services from the software component.

3. The method of claim 2, wherein the first device is configured to request the first subset of the set of services from the software component even though the software component does not include the functionality to perform the first subset of the set of services.

4. The method of claim 1, wherein the first device stores information indicating that the software component includes the functionality to perform the first subset of the set of services.

5. The method of claim 1, further comprising: subsequent to performance of the particular service by the second device, transmitting by the software component to the first device, a confirmation indicating that the particular service is performed.

6. The method of claim 1, further comprising: subsequent to performance of the particular service by the second device, transmitting by the software component to the first device, a confirmation falsely indicating that the software component has performed the particular service.

7. The method of claim 1, wherein the software component exposes the first interface such that the first subset of the set of services is identified as being performed by at least one of: the software component, and a device that is executing the software component.

8. The method of claim 1, further comprising: receiving, by the software component from the second device, data corresponding to execution of the particular service by the second device.

9. The method of claim 1, wherein the software component is executing on the first device.

10. The method of claim 1, wherein the software component is executing on a third device in the first set of one or more devices outside of the firewall, the third device being different than the first device.

11. The method of claim 1, wherein the causing, by the software component, the particular service to be performed inside of the firewall comprises:
forwarding the request to perform the particular service, by the software component to a gateway,
wherein the gateway forwards the request to perform the particular service to the second device.

12. The method of claim 1, wherein the causing, by the software component, the particular service to be performed inside of the firewall comprises:
forwarding the request to perform the particular service, by the software component to a gateway,
wherein the gateway refrains from forwarding the request to perform the particular service to the second device based on a set of permissions associated with the software component and/or the first device.

13. The method of claim 1, wherein the causing, by the software component, the particular service to be performed inside of the firewall comprises:
forwarding the request to perform the particular service, by the software component to a gateway,
wherein the gateway verifies an identity of the software component against a whitelist before forwarding the request to perform the particular service to the second device.

14. The method of claim 1, wherein the causing, by the software component, the particular service to be performed inside of the firewall comprises:
forwarding the request to perform the particular service, by the software component to a gateway,
wherein the gateway is executed on a third device in a same private network as the second device.

15. The method of claim 1, further comprising:
prior to the software component receiving the request to perform the particular service:
receiving by the software component from a gateway, a request to establish a connection between the software component and the gateway, the gateway executing in a same private network as the second device.

16. The method of claim 1, further comprising:
prior to the software component receiving the request to perform the particular service:
establishing a secure connection with a gateway, the gateway executing in a same private network as the second device.

17. The method of claim 1, wherein the software component does not forward, from the first device to the second device, a request for a service that is not within the first subset of the set of services.

18. A non-transitory computer readable medium comprising instructions which, when executed by one or more hardware processors, cause performance of operations comprising:
executing a software component outside of a firewall that exposes, to a first set of one or more devices outside of the firewall, a first interface for requesting a first subset of a set of services provided by a second device inside of the firewall, without exposing any interface to request a second subset of the set of services provided by the second device;

wherein the second device provides, to a second set of one or more devices inside the firewall, a second interface for requesting any of the set of services;

wherein the first interface receives requests from the first set of one or more devices outside the firewall, for the first subset of the set of services, in a particular format;

wherein the second interface receives requests from the second set of one or more devices inside the firewall, for the first subset of the set of services, in the particular format;

wherein the software component does not include functionality to perform the first subset of the set of services;

receiving, by the software component from a first device in the first set of one or more devices outside the firewall, a request to perform a particular service of the first subset of the set of services; and causing, by the software component, the particular service to be performed inside of the firewall at least by forwarding the request to perform the particular service to the second device inside of the firewall.

19. A system, comprising:

at least one device including a hardware processor;

the system being configured to perform operations comprising:

executing a software component outside of a firewall that exposes, to a first set of one or more devices outside of the firewall, a first interface for requesting a first subset of a set of services provided by a second device inside of the firewall, without exposing any interface to request a second subset of the set of services provided by the second device;

wherein the second device provides, to a second set of one or more devices inside the firewall, a second interface for requesting any of the set of services;

wherein the first interface receives requests from the first set of one or more devices outside the firewall, for the first subset of the set of services, in a particular format;

wherein the second interface receives requests from the second set of one or more devices inside the firewall, for the first subset of the set of services, in the particular format;

wherein the software component does not include functionality to perform the first subset of the set of services;

receiving, by the software component from a first device in the first set of one or more devices outside the firewall, a request to perform a particular service of the first subset of the set of services; and causing, by the software component, the particular service to be performed inside of the firewall at least by forwarding the request to perform the particular service to the second device inside of the firewall.

20. The method of claim 1, wherein the first interface defines a set of instructions to be used for requesting the first subset of the set of services, without defining any instructions to be used for requesting the second subset of the set of services.

* * * * *

UNITED STATES PATENT AND TRADEMARK OFFICE
CERTIFICATE OF CORRECTION

PATENT NO. : 9,954,824 B2
APPLICATION NO. : 14/728106
DATED : April 24, 2018
INVENTOR(S) : Sarig et al.

Page 1 of 1

It is certified that error appears in the above-identified patent and that said Letters Patent is hereby corrected as shown below:

In the Claims

Column 17, Line 24, Claim 2, after "service" insert -- : --.

Signed and Sealed this
Thirtieth Day of October, 2018

Andrei Iancu
*Director of the United States Patent and Trademark Office*